Aug. 11, 1970     R. L. TRIMBLE     3,523,370
SIZE MEASUREMENT OF EXTRUDED CASINGS
Filed June 10, 1968     3 Sheets-Sheet 1
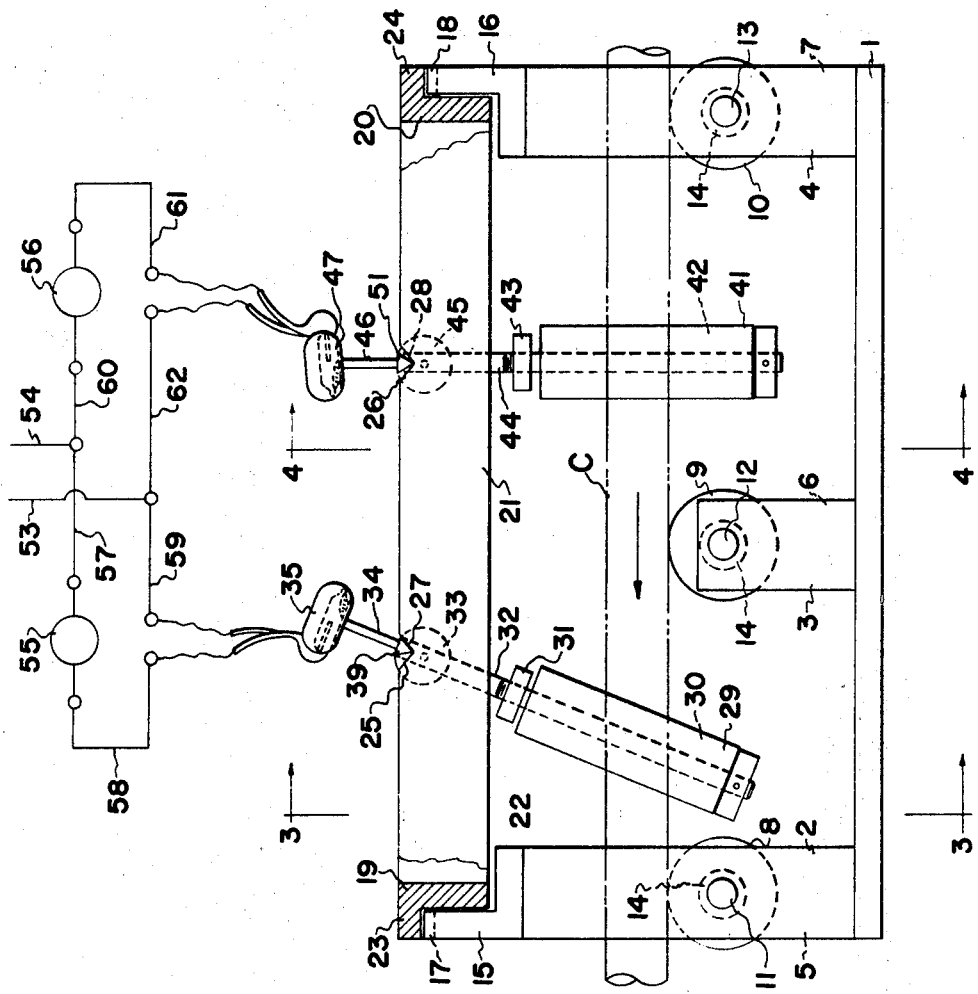
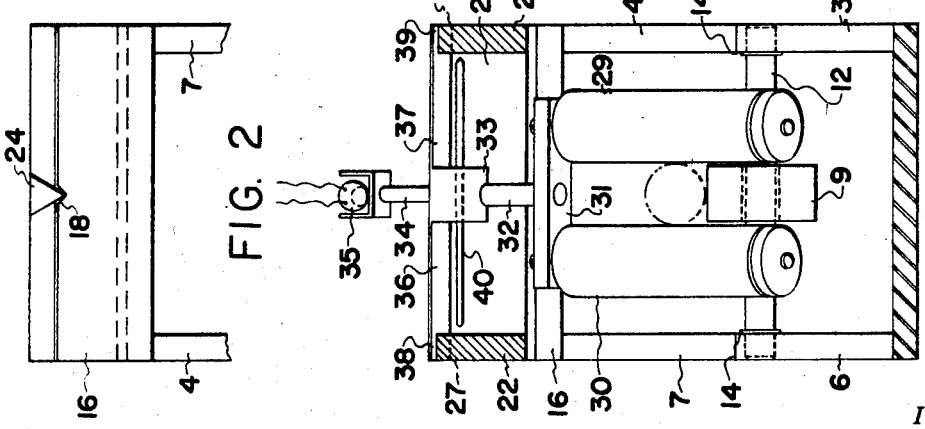
INVENTOR.
ROY LANE TRIMBLE
his attorney

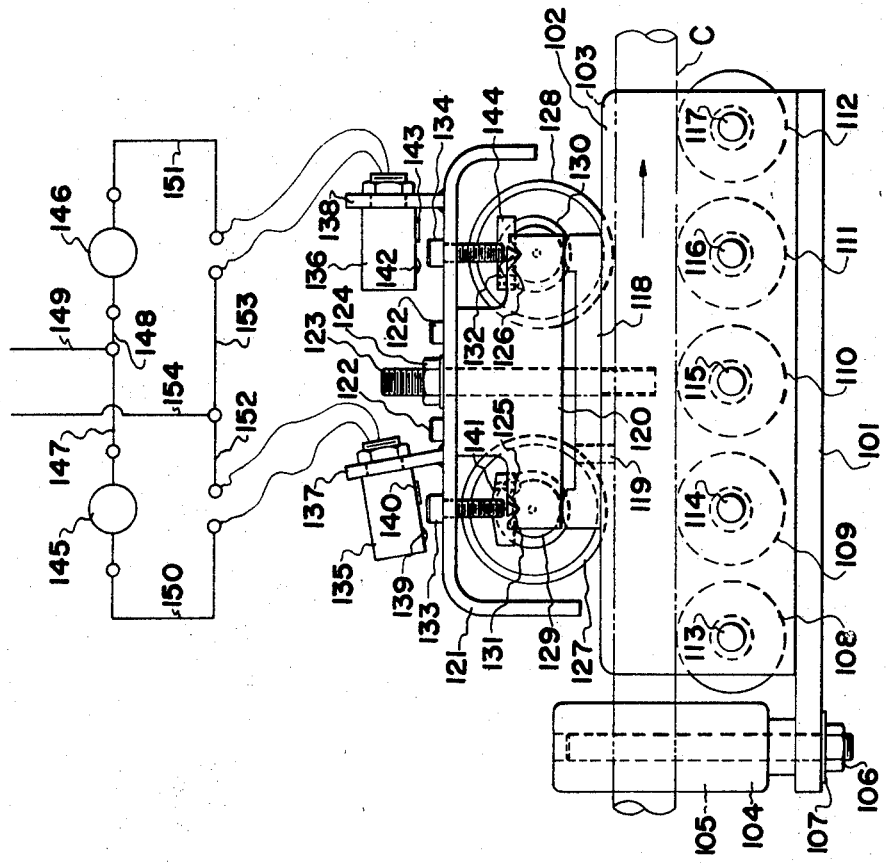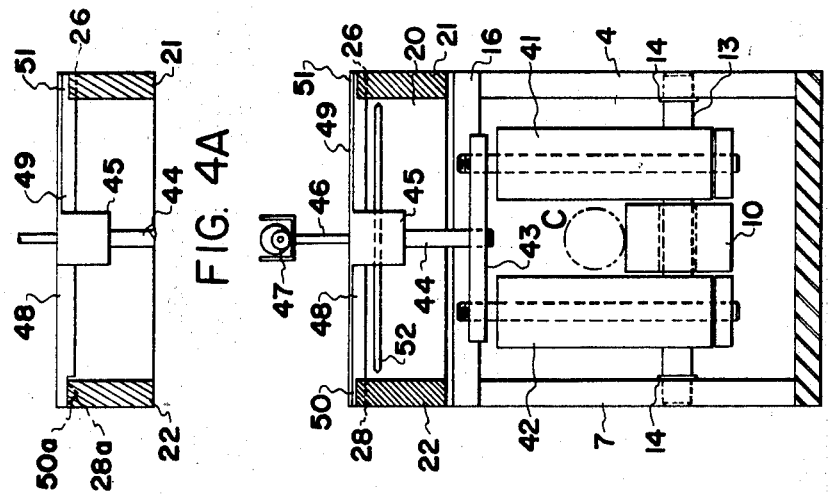

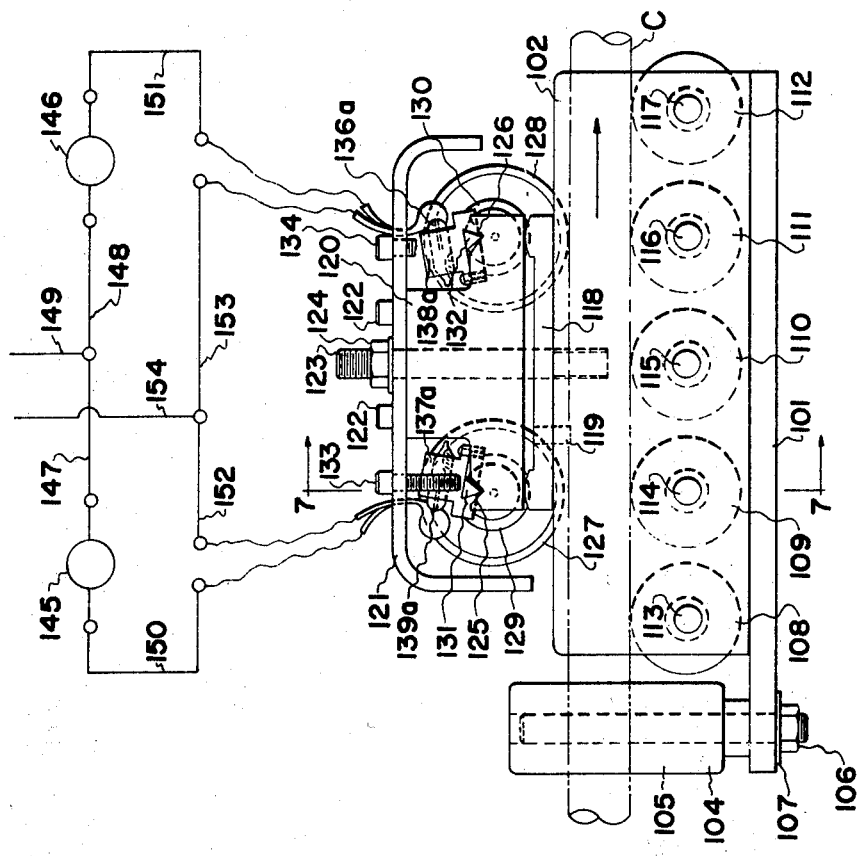
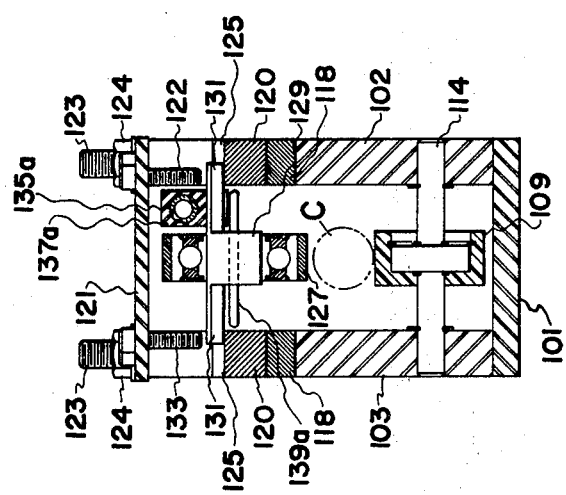

United States Patent Office 3,523,370
Patented Aug. 11, 1970

3,523,370
SIZE MEASUREMENT OF EXTRUDED CASINGS
Roy Lane Trimble, Danville, Ill., assignor to Tee-Pak, Inc., Chicago, Ill., a corporation of Illinois
Filed June 10, 1968, Ser. No. 735,882
Int. Cl. G01b 5/04, 3/38
U.S. Cl. 33—174                                   15 Claims

ABSTRACT OF THE DISCLOSURE

An apparatus for automatic and continuous size measurement of extruded and inflated tubular food casings comprises first and second spaced rollers having a position corresponding respectively to the maximum and minimum size of acceptable casing. The casing moves continuously adjacent both rollers and in the acceptable size range contacts only the second roller. Expansion of the casing beyond the maximum acceptable size contacts the first roller which actuates an oversize indicator signal. Contraction of the casing away from contact with the second roller causes said roller to actuate an undersize indicator signal.

BACKGROUND OF THE INVENTION

This invention relates to a novel apparatus for the size measurement of flexible tubular casing, and more particularly to a novel apparatus for the automatic size measurement of artificial sausage casings made from clear or fiber-reinforced regenerated cellulose, collagen, etc.

While this invention is primarily concerned with size measurement and control in tubular food casings, the following background information about the casing industry and its peculiar problems is considered necessary to a fuller understanding of the invention.

Natural casings are prepared from the intestines of various edible animals, primarily cattle and sheep. The intestines are removed from the slaughtered animal and thoroughly cleaned by processes well known in the art. Natural casings, which have been thoroughly cleaned, are stuffed with various sausage meat compositions and formed into sausage links in preparation for cooking. However, the use of natural casings is severely limited by the wide range of sizes of such casings as well as irregular quality and supply.

Prior to about 1925, substantially all sausage casings natural casings prepared from animal intestines. Since that time, there have been developed several types of synthetic sausage casings, primarily of regenerated cellulose, which are used in the preparation of the major portion of sausages which are made and sold today.

In the processing of various sausages, different types of cellulose casings are employed. For the preparation of small sausages, such as frankfurters, small-diameter, thin-walled casings are prepared from regenerated cellulose or other suitable materials and are generally shirred or pleated and compressed from lengths ranging from 40–160 feet or more down to shirred and compressed lengths of the order of 6–24 inches.

Natural casings and small, thin-walled cellulose casings were originally prepared in shirred form by hand shirring. At a later date, machines, such as that disclosed in Dietrich U.S. Pat. 2,010,626, were developed to shirr casings for delivery to the meat packer in shirred form. Later, automatic machinery was developed for shirred casings such as that disclosed in Korsgaard U.S. Pat. 2,583,654, and Ives U.S. Pat. 3,112,517, and apparatus, such as that shown in Blizzard et al. U.S. Pats. 2,722,714, 2,722,715, and 2,723,201, was developed for the production of shirred casings that were more uniform in appearance and easy to handle.

While small sausages, such as frankfurters, are usually prepared using thin-walled, small-diameter, shirred cellulose casings, larger sausages are prepared using large-diameter, heavy-walled cellulosic casings. These casings are sometimes provided in shirred form to the meat packer and sometimes sold as flat tubes of relatively short length which are handled by the meat packer without the necessity of pre-shirring. Other sausages, e.g. of the bologna-type, are often prepared using fibrous-paper-reinforced casings, known in the trade as fibrous casings. Fibrous casings are prepared by forming a high-wet-strength hemp paper (or other suitable paper) into a tube of indefinite and continuous lengths and impregnating the tube with viscose and regenerating the cellulose therein. The fibrous and heavy walled cellulosic casings are normally cut to relatively short (e.g., 4–8 feet) lengths and are bunched or shirred by hand onto a stuffing horn by the stuffing machine operator. In some cases the casings are pre-shirred and delivered to the packer as shirred strands for ease of application to the stuffing horn. These casings have been shirred using the process and apparatus of the Blizzard et al. patents and the shirred products have proven to be especially useful in continuous preparation of large-diameter sausages.

Cellulose casings, clear and fiber-reinforced, are used in the preparation of large sausages such as bolognas, salamis, and the like, and are removed from the sausage by the customer at the time of final preparation for eating. In preparing these large-diameter sausages, another important consideration is the maintenance of accurate size control over the stuffed sausage being produced. It is very important that the diameter of large sausages be controlled very carefully so that the meat packer may slice the sausage into slices of pre-determined thickness and diameter for pre-packaging. The slices must be accurately sliced so that a given number of slices weigh a precisely predetermined amount. When a meat packer is pre-packaging sliced sausage meats, he requires that a given number of slices weigh exactly one pound or some other pre-selected weight. In stuffing large diameter sausages, there is some tendency to obtain a variation in sausage diameter, depending upon the stretch characteristics of the sausage casing and pressure used in stuffing. There is less variation in diameter of stuffed sausages which use fibrous casing than those which use clear cellulosic casing. However, accurate size control is required for both types of sausages where the sausage is to be sliced and packaged prior to delivery to the retailer. One important way of controlling the size of the sausage is to control accurately the size of the sausage casing during manufacture.

In preparing artificial sausage casings, whether small- or large-diameter, fibrous or non-fibrous, close size control over the casings is of paramount importance when the casings are to be shirred. If the casing is too small, the shirring wheels will not contact the casing properly and will thereby fail to shirr it. Also, inadequate shirring wheel contact often results in flare-ups which cause the machine to jam. Even if the casing is not quite that small, the casing, although shirred, may not be satisfactorily compressed after the shirring operation. If the casing is too large, the casing may be damaged by the shirring wheels and may jam on the shirring mandrel or otherwise clog the shirring machine. The prior art, however, has given relatively slight consideration to the problem of controlling the size of casing off of an annular extrusion die.

Casing size is controlled during manufacture by inflating the casing with a pre-determined air pressure during drying, which is trapped as a "bubble" by nip rolls at the inlet and outlet end of the dryer. As the dried casing is wound up on reels, its dry, flat width is measured periodically to determine if it is within pre-selected standards. The detection of size variation in casing during shirring is known in the prior art, see U.S. Pats. 2,583,654, 3,112,516, and 3,112,517, and Canadian Pat. 759,193. In shirring machines, detectors are used to determine if the casing is properly inflated and sometimes to determine over-inflation of the casing. In the manufacture of casing, however, size variation detection is still done manually by the process operator at the dry end of windup reel.

STATEMENT OF OBJECTS AND FEATURES

It is, therefore, one object of this invention to provide a new and improved apparatus for the automatic and continuous size measurement of tubular casing during a continuous extrusion process.

Another object of this invention is to provide a new and improved apparatus for continuously sensing outsize casing where the presence of undersize or oversize casing is automatically signaled to the operator.

A feature of this invention is the provision of a new and improved apparatus for the continuous size measurement of extruded tubular casing wherein spaced rollers are employed to continuously sense outsize casing by frictional engagement of certain rollers by undersized casing, thereby actuating appropriate oversize signals.

Another feature of this invention is the provision of new and improved apparatus for sensing outsize casing during manufacture in which the casing passes between rollers operable to signal the passing of oversize casing or undersize casing upon frictional engagement of the casing with oversize indicating roller or movement of the casing out of frictional engagement with undersize indicating rollers.

Other objects and features of this invention will become apparent from time to time throughout the specification and claims as hereinafter related.

BRIEF DESCRIPTION OF THE DRAWINGS

In the drawings:

FIG. 1 is a view in front elevation of one embodiment of the apparatus of this invention with a tubular sausage casing positioned therein, FIG. 2 is a view in right elevation of the upper part of the apparatus shown in FIG. 1, FIG. 3 is a sectional view taken on the section line 3—3 of FIG. 1, FIG. 4 is a sectional view taken on the section line 4—4 of FIG. 1, FIG. 4A is a fragmentary sectional view similar to FIG. 4, illustrating an alternative pivot arrangement for the casing size sensing rollers.

FIG. 5 is a view in front elevation of another embodiment of the apparatus of this invention with a tubular sausage casing positioned therein.

FIG. 6 is a view in front elevation of still another embodiment of the apparatus of this invention with a tubular sausage casing positioned therein, and FIG. 7 is a sectional view taken on the section line 7—7 of FIG. 6.

SUMMARY OF THE INVENTION

This invention comprises a new and improved continuous size measuring apparatus for use in the production of flexible extruded tubular casing such as meat or food casings. The apparatus includes one pair of spaced rollers between which the casing passes without normally contacting the same. If the casing enlarges beyond a pre-determined size, the spaced rollers are contacted by the casing and are moved to actuate a first signal. The apparatus further includes another pair of spaced rollers between which the casing passes in frictional engagement therewith. If the casing contacts below a pre-determined size, frictional contact with said other pair of rollers is lost and the rollers move to a position actuating a second signal. The casing is thereby continuously and automatically monitored for size within a preselected range and casing having the proper diameter is quickly and visually (or audibly) distinguished from casing with diameters outside the proper diameter range.

DESCRIPTION OF THE PREFERRED EMBODIMENT

While this invention will be described with special emphasis upon its use with non-fibrous regenerated cellulose sausage casings prior to shirring, it should be understood that it is equally applicable to measuring the size of any artificial sausage casing or similar material, whether to be shirred or not. This size measuring apparatus can be used with frankfurter casings, large cellulosic casings, fibrous casings, and various tubular plastic casings but is primarily concerned with monitoring the size of casing which is to be shirred on automatic shirring machines. This measuring apparatus can also be used with sausage casings and similar materials which are not intended to be shirred. In general, the process and apparatus of this invention can be used with any flexible tubular material.

Referring to the drawings by numerals of reference, and more particularly to the embodiment of FIGS. 1-4, there is shown a preferred apparatus for monitoring the size of a tubular artificial sausage casing continuously in a casing extrusion and process machine. The apparatus includes a frame comprising a base portion 1 having upwardly extending legs 2, 3 and 4 at the front of the apparatus, as viewed in FIG. 1, and upwardly extending legs 5, 6 and 7 at the rear of the apparatus and illustrated more clearly in FIGS. 3 and 4. The apparatus is provided with a plurality of roller members 8, 9 and 10, respectively, supported in the upwardly extending leg members. Roller member 8 is preferably a ball bearing member having its inner race supported on shaft 11 which extends between leg members 2 and 5. Roller member 9 is preferably a ball bearing member having its inner race supported on shaft 12 extending between leg members 3 and 6. Roller member 10 is preferably a ball bearing member having its inner race supported on shaft 13 extending between leg members 4 and 7. The shaft members supporting each of the roller bearings are supported in apertures in the respective leg members and are provided with retaining washers 14 which secure the shaft against lateral movement. The roller members 8, 9 and 10 are supported with their upper rolling surfaces (i.e. the outer races thereof) tangential to a common horizontal plane.

At the upper end of the apparatus there are provided support members in the form of angles 15 and 16, respectively, supported across the upper ends of leg members 2 and 5, and 4 and 7, respectively, and secured thereon as by welding or brazing. Angle 15 has an upwardly extending leg portion provided with a V notch 17 in its upper edge. Angle 16 similarly has an upwardly extending leg provided with a V notch 18, seen more clearly in FIG. 2. A supporting frame member of hollow rectangular shape is positioned at the upper end of the apparatus between support members 15 and 16. This frame member has laterally extending wall portions 19 and 20 and longitudinally extending wall portions 21, and 22, as shown in FIGS. 1, 3 and 4. The rectangular frame is provided with knife edge members 23 and 24 extending from wall members 19 and 20 and supported in V notches 17 and 18 respectively. The knife edge and V notch support arrangement permits the rectangular frame member to have a rolling motion with respect to the path of travel of casing through the apparatus.

The supporting rectangular frame member is provided with V notches 25 and 26 spaced along wall 21 and V notches 27 and 28 aligned therewith and spaced along wall 22. These V notches are aligned for supporting indicator members for pivotal movement. The apparatus is provided with a first size indicator member consisting of a pair rollers 29 and 30 supported on yoke member 31. Supporting yoke 31 is secured on supporting rod member 32 which is supported in member 33 of generally cylindrical shape. At the upper end of support member 33 there is secured rod member 34 at the outer end of which there is supported a mercury switch (or other switch means) 35. Support member 33 is provided with laterally extending arms 36 and 37 which are provided at their outer ends with knife edge portions 38 and 39 supported in V notches 25 and 27 respectively. Support member 33 is also provided with an aperture through which there is positioned spacer rod member 40 which limits lateral movement of member 33 when supported in positioned with knife edges 38 and 39 in V notches 27 and 25. In this portion of the apparatus the rollers 29 and 30 are spaced apart by a pre-determined distance representing the minimum acceptable size for casing being processed. The mercury switch 35 is of a type wherein the contacts are closed when rollers 29 and 30 are hanging in a vertical position.

The apparatus is provided with a second size sensing mechanism comprising a pair of rollers 41 and 42 supported for rotary movement in spaced relation on supporting yoke member 43. Yoke member 43 is in turn supported on rod member 44 secured in the lower end portion of cylindrical shaped supporting member 45. At the upper end of cylindrical supporting member 45 there is provided a rod member 46 at the outer end of which there is supported a mercury switch or other switch means 47. Cylindrical supporting member 45 is provided with outwardly extending arm members 48 and 49 which are preferably formed integrally therewith and which have at their outermost ends knife edge portions 50 and 51 which are supported for pivotal movement in V notches 28 and 26 respectively. Cylindrical member 45 is also provided with an aperture through which there extends a rod member 52 which limits lateral movement of member 45 and the structure supported thereon when knife edge members 50 and 51 are supported in V notches 28 and 26. In this size sensing mechanism the rollers 41 and 42 are spaced apart by a pre-determined distance corresponding to the maximum permissible size of the casing being monitored by the apparatus. The mercury switch, or other switch means, 47 is one in which the contacts are normally open when rollers 41 and 42 are hanging in a vertical position.

The apparatus is positioned normally at the outlet end of the dryer in a casing process machine although it may be positioned at any location where casing size is to be monitored, with casing C moving through the apparatus in a direction indicated by the directional arrow in FIG. 1. The casing normally engages rollers 29 and 30 and rolls past them exerting sufficient frictional contact to move the rollers and switches to the position shown in FIG. 1. Casing C normally does not engage rollers 41 and 42 which normally hang in a vertical position as shown in FIGS. 1 and 4. Whenever casing C enlarges beyond a pre-determined size it will engage rollers 41 and 42 and move the same to actuate switch 47.

The indicating apparatus described above is provided with an electrically energized indicator circuit supplied with power from a suitable power source through lead wires 53 and 54. Wires 53 and 54 are connected by parallel circuits including indicator light 55 includes lead wire 57 connecting lead wire 54 to light 55 and lead wires 58 and 59 connecting switch 35 in position between light 55 and lead wire 53. The circuit for indicator light 56 includes lead wire 60 connecting lead wire 54 to one side of light 56 and lead wires 61 and 62 which are connected to switch 47 and are also connected to light 56 and lead wire 53. In these circuits, whenever switch 35 or 47 is closed it energizes the circuit through light 55 or 56 to indicate the presence of undersize or oversize casing, respectively. The signal lights 55 and 56 are preferably of different color, e.g. amber for undersize casing and red for oversize casing, although any equivalent electrically energized signaling means, such as an on-off indicator, electric horn, etc., could be used, it should also be noted that the spacer rods 40 and 52 shown in FIGS. 3 and 4, for preventing lateral movement of the apparatus, may be substituted by a pivotal support arrangement which does not allow lateral movement. Such an arrangement is shown in FIG. 4A in which the apparatus is modified by providing a cone shaped recess 28a and which there is supported a conically shaped pivot member 50a substituted for knife edge 50. This arrangement permits hub member or supporting member 45 and the apparatus supported thereon to pivot freely without lateral movement. A similar structure may be used in the portion of the apparatus shown in section in FIG. 3 and, if desired, the pivotal arrangement for the rectangular supporting portion of the apparatus, as shown in FIG. 1, could be modified in a similar manner.

OPERATION

The operation of this apparatus should be apparent from the description of its constituent parts and their assembly. However, the operation will be described in more detail for a more thorough understanding of the invention.

Cellulose casings used in the preparation of various sausages are normally prepared by extruding a viscose solution through a die having an annular orifice into a coagulating and regenerating bath. In some instances the casing is provided with a fibrous reinforcement and is made by forming a continuous tube of a fibrous paper which is saturated with a viscose solution extruded through an annular orifice which is in turn passed through a coagulating and regenerating bath to provide a fibrous paper reinforced casing. The regenerated cellulose tubing, with or without fibrous paper reinforcement, is washed to remove by-products and residual acids or salts from the coagulating and regenerating bath, is impregnated with a softening agent or plasticizer such as glycerin and is finally dried. Generally the casing is manufactured continuously at a linear rate ranging from 15 feet/minute, for some types of fibrous casing, up to 100 feet/minute or more for small diameter un-reinforced regenerated cellulose casing. At such extrusion speeds the process operator must be able to determine rapidly and accurately whether the casing is within acceptable size limitations. The apparatus described above provides for a continuous monitoring of the casing size and permits more rapid and more frequent adjustment or control of the process then is possible when the casing is measured for size deviation manually.

In normal operation, this casing is used for automatic size measurement (and control) of small diameter sausage casings after drying. Referring to the embodiment of FIGS. 1–4 (and FIG. 4A), cellulose casing from a dryer (not shown) passes through the apparatus to the left at a linear speed of 75–90 feet per minute.

When the casing C is within the normal pre-determined acceptable size limits, it engages rollers 29 and 30 and continually moves them to the position shown in FIG. 1. In this position, mercury switch 35, or other suitable switch means, is held in position with the switch contacts open and signal light 55 is thereby de-energized.

When casing C is in the proper size range, it normally passes between rollers 41 and 42 without contacting either of them. Rollers 41 and 42 therefore hang in a vertical position, as shown in FIG. 1, with mercury switch 47, or other switch means, having its contacts open and thus de-energizing the circuit through signal light 56.

If the casing C becomes over-inflated, it will engage rollers 41 and 42 and move the same to the left to a position corresponding to that shown for rollers 29 and 30. In this position, mercury switch 47 has its contacts closed and signal light 56 (or other signal means) is energized to indicate the presence of an oversize casing.

If casing C becomes under-inflated or undersize for any reason it will lose contact with rollers 29 and 30 thereby allowing those rollers to move to a vertical position corresponding to the position shown for rollers 41 and 42 in FIG. 1. When rollers 29 and 30 are in the vertical position mercury switch 35 is moved to a position at which its contacts are closed and the circuit is completed through signal light 55 causing it to be energized to indicate the presence of undersized casing in the apparatus.

The arrangement of knife edge members 23 and 24 and V notch supports 17 and 18, as shown in FIGS. 1 and 2, permits the entire sensing apparatus to pivot or roll about its longitudinal axis. This arrangement compensates for lateral wander of the casing from side to side in the apparatus. If the supports for rollers 29 and 30 and rollers 41 and 42 were fixed and not in a movable frame the movement of casing C from side to side in the apparatus would cause it to engage one of the rollers 41 or 42, from time to time, and would give a false indication of the presence of oversize casing. The construction used in this apparatus is such that the lateral wander of casing C will cause the motion of the casing to be transmitted through rollers 29 and 30 to pivot the supporting frame and cause rollers 41 and 42 to move in the same direction and thus prevents casing C from contacting rollers 41 and 42 and giving a false indication of oversize casing.

AN ALTERNATE EMBODIMENT

In FIG. 5 there is shown an alternate embodiment of the apparatus for monitoring continuously the size of extruded casing. The apparatus comprises a supporting frame having a base plate 101 with vertically extending side plates 102 and 103 secured thereon, as by welding. At the left end of the apparatus, as seen in FIG. 5, there are provided a pair of vertically extending roller bearing members 104 and 105 spaced apart by the normal diameter of the casing being measured. Roller members 104 and 105 are secured on base plate 101 by retaining nuts 106 and washers 107. The apparatus is provided with a plurality of ball bearing members 108, 109, 110, 111, and 112 which have their inner races supported on shafts 113, 114, 115, 116, and 117, respectively, supported in wall members 102 and 103. The outer races of the ball bearing members provide cylindrical rolling surfaces tangential to a common plane, and are aligned with the space between guide rollers 104 and 105.

The upper portion of the apparatus includes the spacer members 118 secured on plate members 102 and 103 by screw connection 119. An upper frame member comprising spaced wall members 120 extending in a vertical direction and cover plate member 121 extending horizontally is supported on spacer members 118. Plate member 121 is secured on wall members 120 by screws 122. This frame is secured in place by a pair of bolts 123 extending through wall members 120 into wall members 102 and 103 respectively and provided with nuts 124 holding frame in position.

Wall members 120 are each provided with V notches 125 and 126 for supporting indicating rollers 127 and 128, respectively. Rollers 127 and 128 are ball bearing members having their inner races supported on cylindrical hubs 129 and 130 respectively. Hubs 129 and 130 each have laterally extending arms terminating knife edges 131 and 132, respectively, supported in V notches 125 and 126. Screws 133 and 134 are positioned through supporting plate 121 and terminate a short distance above supporting knife edges 131 and 132, respectively, to prevent the supporting knife edges from being dislodged during operation of the apparatus.

The outer cylindrical races of 127 and 128 of the rollers are arranged for free rotation upon contact with casing moving through the apparatus. Cylindrical race 128 is spaced in relation to roller 111 a pre-determined distance corresponding to the minimum acceptable size for casing being monitored by the apparatus. The outer cylindrical race 127 of the upper roller is spaced from roller 109 a pre-determined distance corresponding to the maximum acceptable distance for casing being monitored.

The apparatus is provided with a pair of photocells 135 and 136 supported on brackets 137 and 138 on supporting plate 121. Photocell 135 is provided with an activator light 139 and photo conductive member 140. Hub 129 of roller 127 is provided with mirror 141 secured on the upper portion thereof and having a configuration arranged to reflect light from activator light 139 to photo conductive member 140 when rotated in a counterclockwise direction. In the position shown in FIG. 5 the photocell is inactive and does not complete an electric circuit. Upon rotation of hub 129 in a counterclockwise direction mirror 141 will cause light from activator light 139 to be reflected into photoconductive cell 140 and cause a circuit to be completed.

Photoelectric cell 136 comprises activator light 142 and photoconductive member 143 and is positioned for activation in response to movement of mirror 144 which is secured on hub 130 of roller 128. In the position shown in FIG. 5 the photocell is inactive. Upon movement of hub 130 and mirror 144 in a clockwise direction, whenever casing C is out of engagement with roller 128, mirror 144 is operative to reflect light from activator light 142 to photoconductive member 143 and energize photocell 136.

The indicator portion of the apparatus comprises a pair of indicator members 145 and 146 which may be signal lights of different colors or indicator gauges or audible signals or the like. Indicator means 145 and 146 are connected on one side by lead wires 147 and 148 to lead wire 149 of a power source. The indicator members are connected on the other side by lead wires 150 and 151 to photocells 135 and 136 which are, in turn, connected by lead wires 152 and 153 to lead wire 154 connected to the power source. In the position shown in FIG. 5 neither of the photocells is activated, with the result that both of the signal lights 145 and 146 are turned off.

OPERATION

In the embodiment of the invention, shown in FIG. 5, as described above, casing C moves through the apparatus from left to right as indicated by the directional arrow. The casing is received from the dryer in an inflated condition and is monitored continuously for size variation within predetermined limits. The casing passing through the apparatus is controlled against lateral wander by rollers 104 and 105. The casing passes along the surface of rollers 108, 109, 110, 111, and 112 and beneath rollers 127 and 128. In its normal inflated condition, casing C contacts both rollers 111 and 128 and causes them to roll with the movement of the casing. The spacing between rollers 111 and 128 represents the minimum acceptable size for the casing. In the position shown, the casing does not contact roller 127 which is spaced from roller 109 by a distance corresponding to the maximum size of the casing.

In the condition of the apparatus shown in FIG. 5, neither of the photocells 135 or 136 is energized and neither of the signal lights 145 and 146 is on. As previously noted, roller 128 is continuously rotated in a counterclockwise direction by movement of casing C from left to right in the apparatus, thus tilting mirror 144 to a position maintaining photocell 136 in a de-energized position. In the event that casing C is deflated or otherwise becomes smaller than the distance between rollers 111 and 128, the casing then no longer contacts roller 128 and ceases to rotate that roller in a counterclockwise direction. In such a condition mirror 144 then moves to a position causing light from activator light 142 to be reflected onto photoconductive element 143 and thus energize photocell 136. When photocell 136 is energized, light 146 is turned on thus indicating the presence of undersized casing in the apparatus.

If casing C becomes overinflated or is otherwise too large, it will contact roller 128 and cause the same to rotate in a counterclockwise direction. The rotation of roller 127 in a counterclockwise direction will cause mirror 141 to be rotated into a position causing light from activator light 139 to be reflected against photoconductive element 140 and thus energize photocell 135. When photocell 135 is energized, signal light 145 is turned on and the presence of oversize casing in the apparatus is indicated.

A THIRD EMBODIMENT OF THE INVENTION

In FIGS. 6 and 7 of the drawings there is shown still another embodiment of the invention which is essentially identical to the embodiment shown in FIG. 5 in all respects except for the substitution of mercury switches for the photocell and mirror arrangement of FIG. 5. In the apparatus shown in FIGS. 6 and 7 the parts which are common to FIG. 5 are given the same reference numbers without further description of the parts or their assembly. Mercury switches 135a and 136a are substituted for photocells 135 and 136 and are carried in brackets 137a and 138a supported on hubs 129 and 130 respectively.

OPERATION

The operation of the embodiment of the invention shown in FIG. 6 and essentially identical to that described for the embodiment shown in FIG. 5 except that the activation of the signal lights 145 and 146 (or other signal means) is effected by movement of mercury switches 135a and 136a rather than mirrors 141 and 144 which activate photocells 135 and 136 in FIG. 5.

In the apparatus shown in FIG. 6 the casing C is moving from left to right and is guided against lateral wander by vertically extending rollers 104 and 105. Casing C normally moves along the surface of rollers 108, 109, 110, 111, and 112 and is normally confined between rollers 111 and 128 which are spaced apart by a distance corresponding to the minimum acceptable diameter for casing being monitored. Rollers 109 and 127 are spaced apart by a distance corresponding to the maximum acceptable diameter for casing being monitored by the apparatus. The rollers 127 and 128 are supported by knife edge supports in V notches as previously described and are protected against lateral displacement by spacing rods 139a. The hubs 129 and 130 for the measuring rollers support mercury switches 135a and 136a for pivotal movement. In the position shown in FIG. 6, roller 127 is not contacted by casing and has the position indicated with mercury switch 135a in a de-activated or open position. Roller 128 is continuously rotated by movement of casing C thereagainst and causes hub 130 to rotate in a counterclockwise direction moving mercury switch 136a to an inactive or open position.

In the apparatus described and shown in FIGS. 6 and 7 the switches 135a and 136a are both open and signal lights 145 and 146 are off when the casing is within the acceptable size range. If the casing decreases in size below the acceptable size range it comes out of contact with roller 128, thus allowing hub 130 to rotate in a clockwise direction moving mercury switch 136a to a closed position. In this position signal light 146 is turned on giving a visual signal of the presence of the undersized casing. If the casing enlarges beyond the acceptable size limit it contacts roller 127 and causes hub 129 to rotate in a counterclockwise direction moving mercury switch 135a to a closed position. When this occurs, signal light 145 is turned on, thus indicating the presence of oversize casing in the apparatus.

While the invention has been described fully and completely with special emphasis upon several preferred embodiments, it is to be understood that within the scope of the appended claims the invention may be practiced otherwise than as specifically described herein.

I claim:
1. An apparatus for the continuous automatic size measurement of continuously moving inflated flexible extruded tubular casing comprising,
 a first actuation means positioned for engagement with the casing moving therethrough and actuated by contact with said moving casing,
 a first signal means activated by said first actuation means upon expansion of said moving casing beyond a first pre-determined size,
 a second actuation means having a position normally engaging the moving casing and actuated by said casing contracting below a second pre-determined size, and
 a second signal means actuated by said second actuation means upon contraction of said moving casing below said second pre-determined size.

2. An apparatus as defined in claim 1 in which said first actuation means comprises a first roller means positioned for rolling engagement with said casing upon expansion of said casing beyond said first pre-determined size, and said second actuation means comprising a second roller means positioned for rolling engagement with said casing and actuated by said casing below said second pre-determined size.

3. An apparatus as defined in claim 2 in which each of said roller means have hubs or axles supported for pivotal movement and operable upon pre-determined pivotal movement to activate the respective signal means.

4. An apparatus as defined in claim 2 wherein said first roller means comprises a first pair of spaced rollers between which said casing passes and spaced to have frictional rolling engagement with casing of said first pre-determined size, and said second roller comprises a second pair of spaced rollers between which said casing passes, at least one of said second pair of spaced rollers being out of frictional rolling engagement with said casing when said casing is less than second pre-determined size.

5. An apparatus as defined in claim 2 in which said first and second actuation means includes first and second switch means, respectively, actuated thereby to activate said first and second signal means, respectively.

6. An apparatus as defined in claim 5 in which said switch means comprises photoelectric means.

7. An apparatus as defined in claim 5 in which said switch means comprises mercury switches.

8. An apparatus as defined in claim 3 in which said first roller means comprises a first pair of spaced rollers having axles supported in a substantially vertical position for pivotal movement, said second roller means comprises a second pair of spaced rollers having axles supported in a substantially vertical position for pivotal movement, a first switch means positioned for actuation by pivotal movement of said first pair of rollers and operable upon pre-determined movement to activate said first signal means, a second switch means positioned for actuation by pivotal movement of said second pair of rollers and operable upon pre-determined movement to activate said second signal means, said first pair of rollers being spaced by a distance corresponding to the maximum acceptable diameter of casing being measured and contacted by said casing upon expansion beyond said first pre-determined size to move pivotally and actuate said first switch means, said second pair of rollers normally engaging said casing and having a spacing corresponding to the minimum acceptable diameter of casing being measured, and said second pair of rollers being released for pivotal movement actuating said second switch means upon contraction of said casing below said second pre-determined size.

9. An apparatus as defined in claim 8 including guide roller means supporting said casing against vertical movement in at least one direction.

10. An apparatus as defined in claim 8 including a frame supported for lateral pivotal movement relative to the movement of said casing, and said first and second pair of rollers being pivotally supported on said frame.

11. An apparatus as defined in claim 8 in which said first and second switch means comprise mercury switches or photoelectric means.

12. An apparatus as defined in claim 3 in which said first roller means comprises a first pair of vertically spaced rollers having axles supported in a substantially horizontal position with the lower axle being fixed and the upper axle having a hub portion supported for pivotal movement, said second roller means comprising a second pair of vertically spaced rollers having axles supported in a substantially horizontal position with the lower axle being fixed and the upper axle having a hub portion supported for pivotal movement, a first switch means positioned for actuation by pivotal movement of said first upper roller hub and operable upon pre-determined movement to activate said first signal means, a second switch means positioned for actuation by pivotal movement of said second upper roller hub and operable upon pre-determined movement to actuate said second signal means, said first pair of rollers being spaced by a distance corresponding to the maximum acceptable diameter of casing being measured and contacted by said casing upon expansion beyond said pre-determined size to move said first upper hub pivotally and actuate said first switch means, said second pair of rollers normally engaging said casing and having a spacing corresponding to the minimum acceptable diameter of casing being measured, and said second pair of rollers being released for pivotal movement of said second upper hub pivotally to actuate said second switch means upon contraction of said casing below said second pre-determined size.

13. An apparatus for the continuous automatic size measurement of continuously moving inflated flexible extruded tubular casing by activation of a first or second signal means indicating the presence of out-size casing comprising, a first actuation means positioned for engagement with inflated casing moving therethrough and actuated by contact with said moving casing, a first switch means for activating a signal means and positioned for actuation by said first actuation means upon expansion of said moving casing beyond a first pre-determined size, a second actuation means having a position normally engaging the moving casing and actuated by said casing contracting below a second pre-determined size, and a second switch means positioned for actuation by said second actuation means to activate a signal means upon contraction of said casing below said second pre-determined size.

14. An apparatus as defined in claim 13 in which said first actuation means comprises a first roller means positioned for rolling enagement with said casing upon expansion of said casing beyond said first pre-determined size, and said second actuation means comprising a second roller means positioned for rolling engagement with the casing and actuated by said casing contracting below said pre-determined size.

15. An apparatus as defined in claim 14 in which each of said roller means have hubs or axles supported for pivotal movement and operable upon pre-determined pivotal movement to actuate each of said switch means.

References Cited

UNITED STATES PATENTS

| | | |
|---|---|---|
| 1,963,310 | 6/1934 | Nichols. |
| 2,519,221 | 8/1950 | Bogen. |
| 2,676,298 | 4/1954 | Frommer. |

SAMUEL S. MATTHEWS, Primary Examiner

U.S. Cl. X.R.

33—147, 168

UNITED STATES PATENT OFFICE
CERTIFICATE OF CORRECTION

Patent No. 3,523,370          Dated    August 11, 1970

Inventor(s) Roy Lane Trimble

It is certified that error appears in the above-identified patent and that said Letters Patent are hereby corrected as shown below:

Column 1, line 49, after "casings" insert -- were -- . Column 5, line 17, change "positioned" to read -- position -- ; line 66, after "circuits" insert -- to indicator lights 55 and 56. The circuit -- . Column 6, line 5, change the comma to a period; and change "it" to -- It -- . Column 12, line 17, change "enagement" to -- engagement -- .

Signed and sealed this 14th day of November 1972.

(SEAL)
Attest:

EDWARD M. FLETCHER, JR.
Attesting Officer

ROBERT GOTTSCHALK
Commissioner of Patents